(12) United States Patent
Yamada

(10) Patent No.: US 10,570,964 B2
(45) Date of Patent: Feb. 25, 2020

(54) VIBRATION ABSORBER

(71) Applicant: HONDA MOTOR CO., LTD., Tokyo (JP)

(72) Inventor: Toshifumi Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 264 days.

(21) Appl. No.: 15/550,410

(22) PCT Filed: Feb. 1, 2016

(86) PCT No.: PCT/JP2016/052883
§ 371 (c)(1),
(2) Date: Aug. 11, 2017

(87) PCT Pub. No.: WO2016/147715
PCT Pub. Date: Sep. 22, 2016

(65) Prior Publication Data
US 2018/0031045 A1    Feb. 1, 2018

(30) Foreign Application Priority Data
Mar. 19, 2015   (JP) ................. 2015-056014

(51) Int. Cl.
*F16D 3/12* (2006.01)
*F16F 15/134* (2006.01)
*F16D 13/70* (2006.01)

(52) U.S. Cl.
CPC .............. *F16D 3/12* (2013.01); *F16F 15/134* (2013.01); *F16D 2013/703* (2013.01); *F16D 2300/22* (2013.01); *F16F 2230/04* (2013.01)

(58) Field of Classification Search
CPC .. F16D 3/12; F16D 2300/22; F16D 2013/703; F16F 15/134; F16F 2230/04
(Continued)

(56) References Cited

U.S. PATENT DOCUMENTS 2,337,134 A  * 12/1943  Thelander ......... F16F 15/12333
4,588,058 A     5/1986  Aliouate
(Continued)

FOREIGN PATENT DOCUMENTS

CN     102597567 A    7/2012
CN     103189670 A    7/2013
(Continued)

OTHER PUBLICATIONS

Office Action dated Jul. 16, 2018, issued in counterpart Chinese Application No. 201680008016.4, with English translation. (9 pages).
(Continued)

*Primary Examiner* — Greg Binda
(74) *Attorney, Agent, or Firm* — Westerman, Hattori, Daniels & Adrian, LLP; Stephen B. Parker

(57) ABSTRACT

A vibration absorber is provided which is mounted in an annular space housing a spring of a damper, wherein accompanying rotational fluctuation of a drive source, when a first plate connected to the drive source and a second plate connected to a transmission rotate relative to each other while elastically deforming a spring, an arm part extending radially outward from a driven plate swings in the interior of an annular space, and grease packed in the annular space is compressed by the arm part and pushed inward in the radial direction, but since this grease is guided in the peripheral direction by a flow-aligning projection provided on either one of the driven plate and the seal plate and projecting toward the other, and is prevented from being concentrated in part of a seal member provided on the inner peripheral part of the seal plate and sealing the annular space.

3 Claims, 6 Drawing Sheets

(58) Field of Classification Search
USPC .......... 464/7, 68.3; 192/113.35, 208; 184/12
See application file for complete search history.

(56) References Cited

U.S. PATENT DOCUMENTS

| | | |
|---|---|---|
| 4,739,866 A | 4/1988 | Reik et al. |
| 6,273,823 B1 * | 8/2001 | Rohs .................. F16F 15/165 |
| | | 464/68.3 |
| 6,364,775 B1 | 4/2002 | Rohs et al. |
| 8,747,235 B2 | 6/2014 | Takikawa et al. |
| 9,004,248 B2 | 4/2015 | Kawahara et al. |
| 9,506,547 B2 | 11/2016 | Tomiyama |
| 9,958,027 B2 | 5/2018 | Sekiguchi et al. |

FOREIGN PATENT DOCUMENTS

| | | | |
|---|---|---|---|
| CN | 103261745 A | 8/2013 | |
| CN | 104246301 A | 12/2014 | |
| GB | 2 219 647 A * | 12/1989 | ................ 464/68.3 |
| JP | 2572770 B2 | 1/1997 | |
| JP | 11-30291 A | 2/1999 | |
| JP | 2000-2299 A | 1/2000 | |
| JP | 2006-234058 A | 9/2006 | |

OTHER PUBLICATIONS

International Search Report dated Mar. 8, 2016, issued in counterpart International Application No. PCT/JP2016/052883 (2 pages).

* cited by examiner

SECOND EMBODIMENT

THIRD EMBODIMENT

FOURTH EMBODIMENT

FIFTH EMBODIMENT

SIXTH EMBODIMENT

SEVENTH EMBODIMENT

EIGHTH EMBODIMENT

VIBRATION ABSORBER

TECHNICAL FIELD

The present invention relates to a vibration absorber in which a spring is disposed between a first plate, which is a mass that is connected to a drive source, and a second plate, which is a mass that is connected to a transmission, and transmission of rotational fluctuations of the first plate to the second plate is suppressed by relative rotation of the first and second plates and elastic deformation of the spring.

BACKGROUND ART

With regard to such a vibration absorber, an arrangement in which an annular space formed between the first plate and a seal plate and having the spring disposed therein is packed with grease that is used for lubricating the spring or a spring seat and generating a damping force when the first and second plates rotate relative to each other, and a seal member for preventing the grease from leaking via an inner peripheral part of the annular space is disposed between the seal plate and the second plate, is known from Patent Document 1 below.

RELATED ART DOCUMENTS

Patent Documents

Patent Document 1: Japanese Patent No. 2572770

SUMMARY OF THE INVENTION

Problems to be Solved by the Invention

With regard to the conventional vibration absorber described above, when the first and second plates rotate relative to each other, if a driven plate having an arm part supporting an end part of the spring swings back and forth in the interior of the annular space, since grease packed in the annular space is pushed by the arm part of the driven plate, moves radially inward, and accumulates in part of an outer peripheral face of the seal member, there is a possibility that the pressure of the grease will be increased locally and the grease will leak via the seal member. Consideration could be given to providing a shielding plate that prevents the flow of grease between the arm part and the seal member in order that grease that is pushed by the arm part and moves radially inward is not supplied directly to the seal member, but providing a shielding plate gives rise to the problems that not only does the structure of the vibration absorber become complicated but also the number of components increases.

The present invention has been accomplished in light of the above circumstances, and it is an object thereof to prevent, with a simple structure, grease packed into an annular space housing a spring of a damper from leaking via a seal member provided on an inner peripheral part of a seal plate and sealing the annular space.

Means for Solving the Problems

In order to attain the above object, according to a first aspect of the present invention, there is provided a vibration absorber in which a damper disposed between a drive source and a transmission comprising a first plate connected to the drive source, a second plate connected to the transmission, a seal plate fixed to an outer peripheral part of the first plate and disposed between the first plate and the second plate, a driven plate fixed to an inner peripheral part of the second plate and disposed between the first plate and the seal plate, an annular space formed along an outer peripheral part of the seal plate and the first plate and packed with grease, a spring disposed in a peripheral direction in the annular space and having one end latched on the first plate and the other end latched on an arm portion extending radially outward from the driven plate, and a seal member provided on an inner peripheral part of the seal plate and sealing the annular space, transmission of rotational fluctuations of the first plate to the second plate being suppressed by relative rotation of the first and second plates and elastic deformation of the spring, wherein the vibration absorber comprises a flow-aligning projection that is provided on either one of an arm portion of the driven plate and the seal plate opposing the arm portion and projects toward the other, and the flow-aligning projection guides grease that is flowing inward in a radial direction so as to flow along the peripheral direction.

Further, according to a second aspect of the present invention, in addition to the first aspect, a width in the peripheral direction of the flow-aligning projection increases in going from a radially outer side toward a radially inner side.

A first flywheel 14 of an embodiment corresponds to the first plate of the present invention, a second flywheel 16 of the embodiment corresponds to the second plate of the present invention, a coil spring 22 of the embodiment corresponds to the spring of the present invention, and an engine E of the embodiment corresponds to the drive source of the present invention.

Effects of the Invention

In accordance with the first aspect of the present invention, accompanying rotational fluctuation of the drive source, when the first plate connected to the drive source and the second plate connected to the transmission rotate relative to each other while elastically deforming the spring, the arm part extending radially outward from the driven plate swings in the interior of the annular space, and the grease packed in the annular space is compressed by the arm part and pushed inward in the radial direction, but since this grease is guided in the peripheral direction by the flow-aligning projection provided on either one of the arm part of the driven plate and the seal plate opposing the arm part and projecting toward the other and is prevented from being concentrated in part of the seal member provided on the inner peripheral part of the seal plate and sealing the annular space, it is possible to prevent the leakage of grease via the seal member without requiring a special shielding plate.

Furthermore, in accordance with the second aspect of the present invention, since the width in the peripheral direction of the flow-aligning projection increases in going from the radially outer side to the radially inner side, it is possible, by smoothly dispersing grease flowing inward in the radial direction to opposite sides in the peripheral direction by the flow-aligning projection, to more reliably prevent grease from being concentrated in part of the seal member and leaking.

EXPLANATION OF REFERENCE NUMERALS AND SYMBOLS

Figure 1:
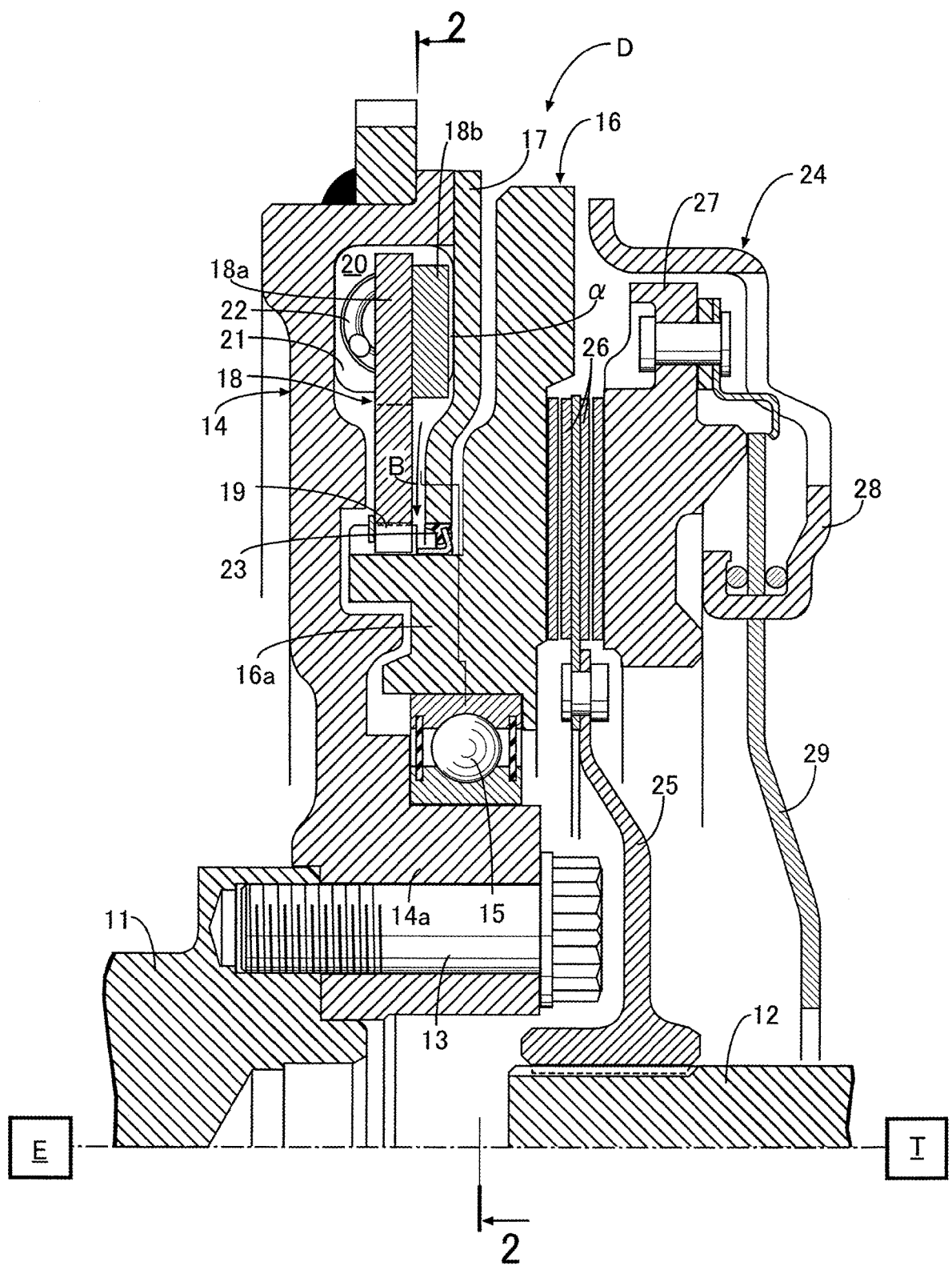
FIG. 1 is a vertical sectional view of a vibration absorber. (first embodiment)

14 First flywheel (first plate)
16 Second flywheel (second plate)
17 Seal plate
18 Driven plate
18a Arm portion
18b Flow-aligning projection
20 Annular space
22 Coil spring (spring)
23 Seal member
D Damper
E Engine (drive source)
T Transmission
W Width in peripheral direction of flow-aligning projection

MODES FOR CARRYING OUT THE INVENTION

Embodiments of the present invention are explained below by reference to the attached drawings.

First Embodiment

A first embodiment of the present invention is now explained by reference to FIG. 1 to FIG. 3.

Figure 2:
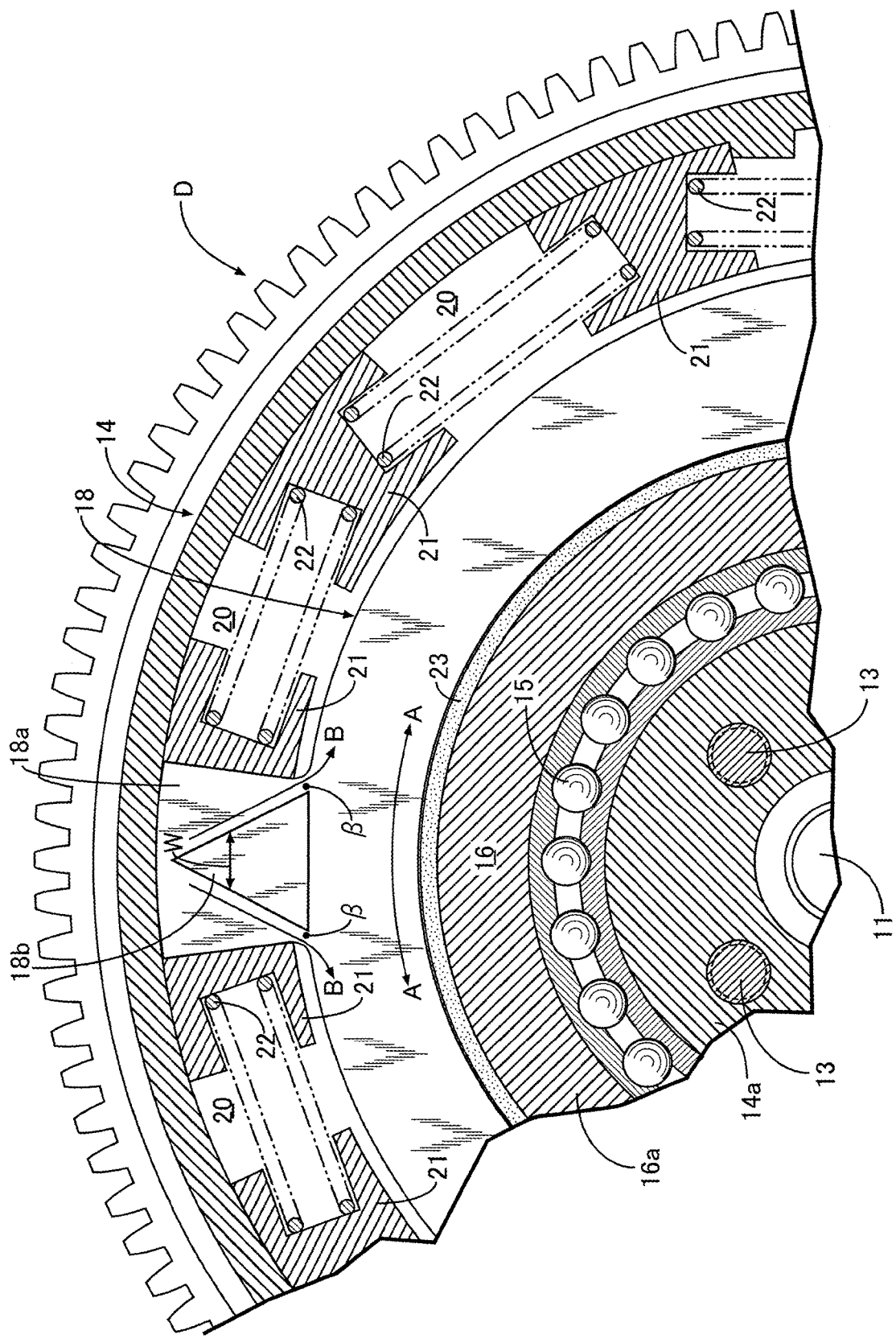
FIG. 2 is a sectional view along line 2-2 in FIG. 1. (first embodiment)

As shown in FIG. 1 and FIG. 2, a damper D disposed between a crankshaft 11 of an engine E and a main shaft 12 of a transmission T includes an annular first flywheel 14 fixed to a shaft end of the crankshaft 11 by bolts 13, and an annular second flywheel 16 relatively rotatably supported on a boss portion 14a on the inner periphery of the first flywheel 14 via a ball bearing 15. An outer peripheral part of a seal plate 17 is fixed to an outer peripheral part of the first flywheel 14 by a rivet, which is not illustrated, and this seal plate 17 extends inward in the radial direction so as to be sandwiched between the first flywheel 14 and the second flywheel 16. An inner peripheral part of a driven plate 18 is joined to a boss portion 16a on the inner periphery of the second flywheel 16 by a spline join 19, and this driven plate 18 extends outward in the radial direction so as to be sandwiched between the first flywheel 14 and the seal plate 17. Therefore, the first flywheel 14, the driven plate 18, the seal plate 17 and the second flywheel 16 are disposed in that order from the crankshaft 11 side toward the main shaft 12 side.

An annular space 20 is formed between the first flywheel 14 and the seal plate 17, the radially outer side of the annular space 20 being blocked and the radially inner side being open, and a plurality of spring seats 21 and a plurality of coil springs 22 are alternatingly disposed in the annular space 20. Two plate-shaped arm portions 18a and 18a whose phases are displaced by 180° from each other extend radially outward from an outer peripheral part of the driven plate 18, each arm portion 18a being sandwiched between two adjacent spring seats 21 and 21. Therefore, rotational fluctuations of the crankshaft 11 are absorbed due to the coil springs 22 being compressed between the first flywheel 14 and the arm portions 18a and 18a of the driven plate 18 rotating integrally with the second flywheel 16 when the first flywheel 14 and second flywheel 16, which have large moments of inertia, rotate relative to each other, and vibration transmitted from the engine E to the transmission T is reduced.

The annular space 20 is packed with grease for lubricating contact parts of the spring seats 21, the coil springs 22, the driven plate 18, etc., and an annular seal member 23 is disposed between an inner peripheral part of the seal plate 17 and the boss portion 16a of the second flywheel 16 so as to prevent the grease from leaking from the annular space 20. Since this grease is agitated by the arm portions 18a and 18a of the driven plate 18 in the interior of the annular space 20 when the first flywheel 14 and the second flywheel 16 rotate relative to each other, a vibration attenuating effect is exhibited by virtue of resistance to this agitation.

A friction clutch 24 that detachably joins the second flywheel 16 to the main shaft 12 of the transmission T includes a clutch disk 25 having an inner peripheral part fixed to the main shaft 12, a friction material 26 provided on an outer peripheral part of the clutch disk 25, a pressure plate 27 disposed on the side opposite to the second flywheel 16 with the friction material 26 sandwiched therebetween, a clutch cover 28 having an outer peripheral part fixed to an outer peripheral part of the second flywheel 16 by a bolt, which is not illustrated, and a diaphragm spring 29 having an intermediate part axially supported on the clutch cover 28 and an outer peripheral part abutting against a back face of the pressure plate 27. Therefore, when an inner peripheral part of the diaphragm spring 29 is driven rightward in FIG. 1, the pressure plate 27 presses the friction material 26 against the second flywheel 16, the second flywheel 16 is joined to the main shaft 12 via the clutch disk 25, and the driving force of the engine E is transmitted to the transmission T.

A flow-aligning projection 18b formed as a separate member is fixed to a face, opposing the seal plate 17, of the arm portion 18a of the driven plate 18 by arbitrary means such as a weld or a rivet. The flow-aligning projection 18b has an isosceles triangular shape having an apex facing radially outward and having a constant thickness, and a width W in the peripheral direction increases gradually in going from the radially outer side toward the radially inner side. A slight gap α is formed between the surface of the flow-aligning projection 18b and the seal plate 17. In the present embodiment, the two base angles of the flow-aligning projection 18b having an isosceles triangular shape are positioned further inside in the radial direction than the radially inner ends of the two spring seats 21 and 21 adjacent to the flow-aligning projection 18b, and a gap β is formed therebetween, grease being capable of passing through the gap β.

The operation of the first embodiment of the present invention having the above arrangement is now explained.

Figure 3:
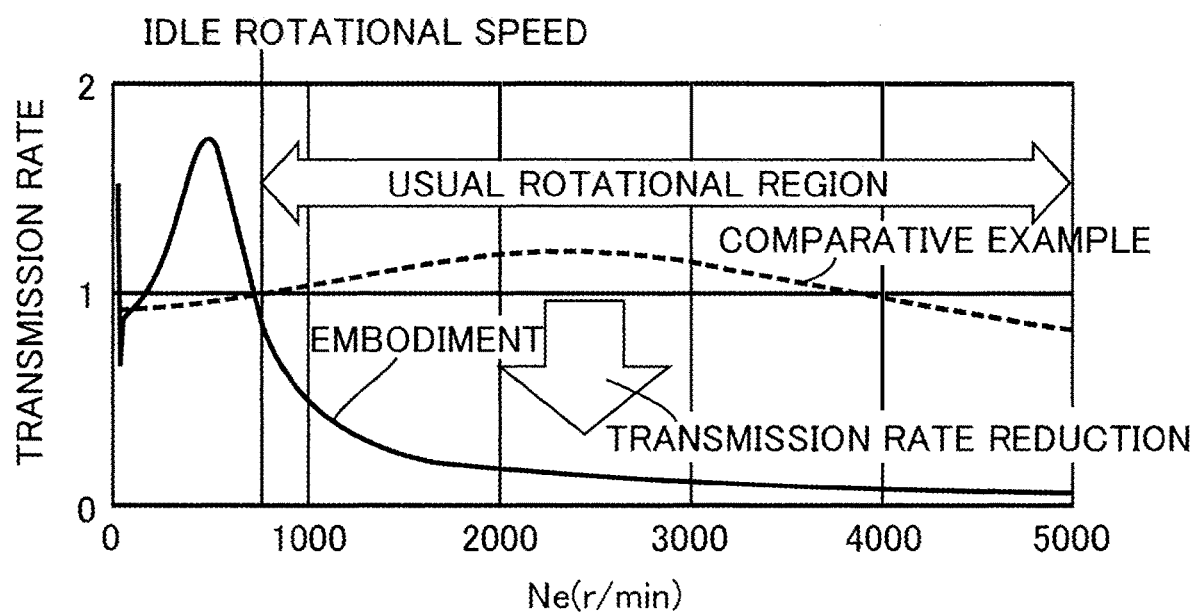
FIG. 3 is a graph showing change in the rate of transmission of vibration from an engine to a transmission with respect to engine rotational speed. (first embodiment)

FIG. 3 shows the change in the rate of transmission of vibration from the first flywheel 14 to the second flywheel 16 with respect to engine rotational speed. The broken line shows the characteristics of one equipped with a single flywheel, which is a Comparative Example, and it can be seen that hardly any vibration reducing effect can be obtained in the usual rotational region of the engine E. On the other hand, the solid line shows the characteristics of the present embodiment equipped with the first flywheel 14 and the second flywheel 16, and it can be seen that a large vibration reducing effect can be obtained in the usual rotational region of the engine E. However, the present embodiment has the problem that the rate of transmission of vibration increases rapidly in a region of resonant rotational speed that is equal to or less than the idle rotational speed of the engine E.

In this way, when starting or stopping the engine E, when the engine rotational speed passes through the resonant rotational speed region, which is equal to or less than the idle rotational speed, and the vibration transmission rate increases rapidly and the first flywheel 14 and the second flywheel 16 rotate greatly relative to each other, since the arm portions 18*a* and 18*a* of the driven plate 18 swing greatly in the interior of the annular space 20, grease packed in the annular space 20 is pushed by the arm portions 18*a* and 18*a* and moves radially inward, and there is a possibility that grease having increased local pressure will pass the seal member 23 on the radially inner side of the arm portions 18*a* and 18*a* and leak outside the annular space 20.

However, in accordance with the present embodiment, since the triangular flow-aligning projections 18*b* and 18*b* projecting toward the seal plate 17 are provided on the surfaces of the arm portions 18*a* and 18*a*, and grease that has been pushed radially inward by the arm portions 18*a* and 18*a*, which swing back and forth in the arrow A-A direction, is guided by the flow-aligning projections 18*b* and 18*b* whose width W in the peripheral direction increases gradually in going toward the radially inner side, and is dispersed to opposite sides in the peripheral direction (see arrows B), an event in which grease builds up locally in part of the seal member 23 and leaks due to vibration, etc. can be avoided.

As described above, in accordance with the present embodiment, with a simple arrangement in which the flow-aligning projections 18*b* and 18*b* are merely provided on the arm portions 18*a* and 18*a* of the driven plate 18, leakage of grease via the seal member 23 can be reliably prevented without providing a special member such as a shielding member for shielding the seal member 23 from grease.

[Second to Eighth Embodiments]

Figure 4A:
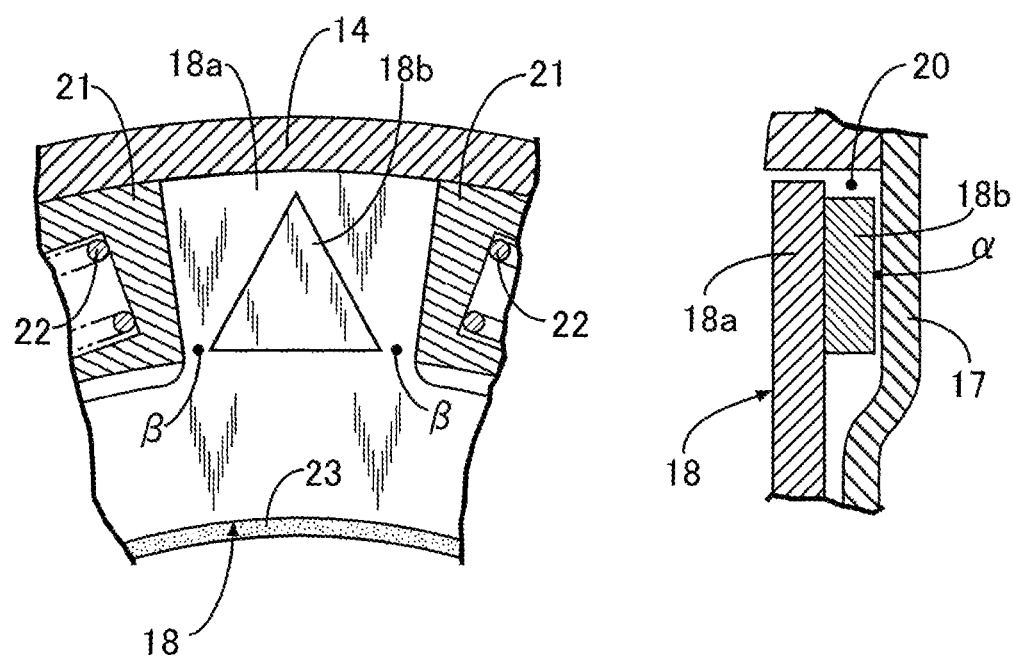
FIG. 4A and FIG. 4B each is a diagram showing another embodiment of a flow-aligning projection. (second and third embodiments)

In the first embodiment shown in FIG. 2, the two base angles of the isosceles triangular flow-aligning projection 18*b* are positioned further inward in the radial direction than the radially inner ends of the two spring seats 21 and 21 adjacent to the flow-aligning projection 18*b*, but in a second embodiment shown in FIG. 4A the two base angles of the isosceles triangular flow-aligning projection 18*b* are positioned further outward in the radial direction than the radially inner ends of the two spring seats 21 and 21 adjacent to the flow-aligning projection 18*b*. In accordance with the present embodiment, since the gap β, through which grease can pass, is formed between the two base angles of the flow-aligning projection 18*b* and the two spring seats 21 and 21, the same operational effects as for the first embodiment can also be achieved.

Figure 4B:
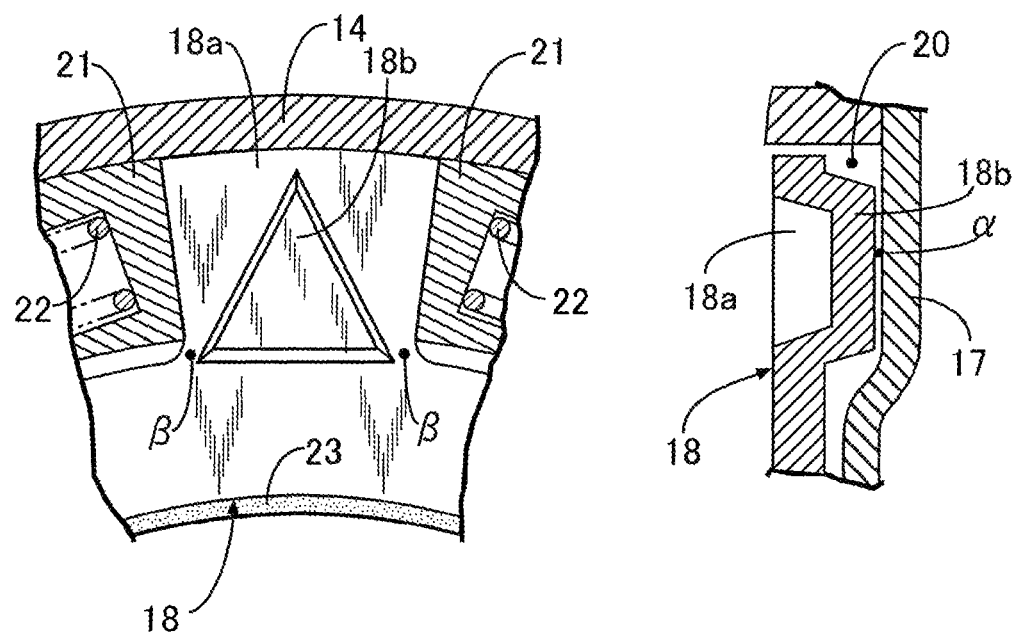

A third embodiment shown in FIG. 4B is a modification of the first embodiment; the flow-aligning projection 18*b* is not formed as a separate member, but is integrally press formed when press forming the driven plate 18.

Figure 5C:
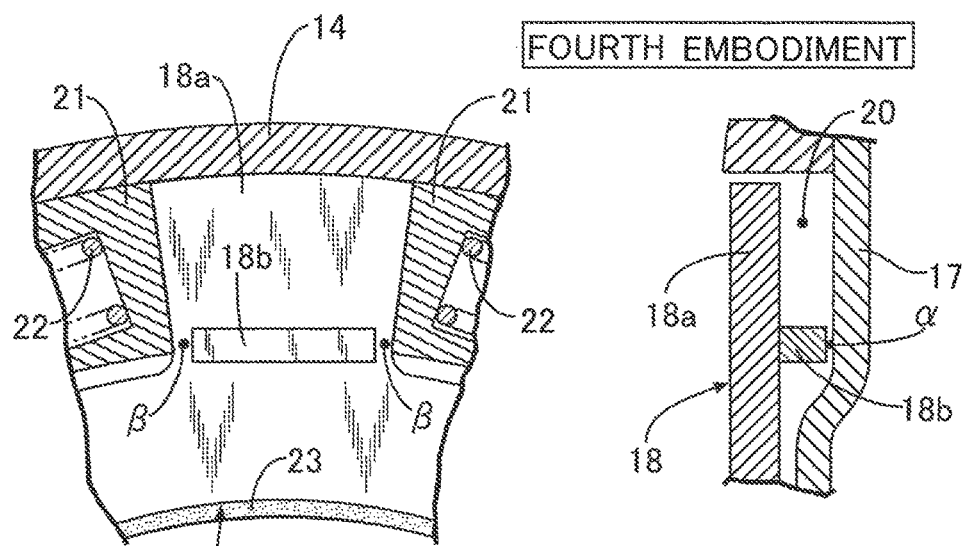
FIG. 5C, FIG. 5D, and FIG. 5E each is a diagram showing another embodiment of the flow-aligning projection. (fourth to sixth embodiments)

Furthermore, a fourth embodiment shown in FIG. 5C is a modification of the first embodiment; the flow-aligning projection 18*b* is formed not as an isosceles triangular shape but as a linear shape extending in the peripheral direction.

Figure 5D:
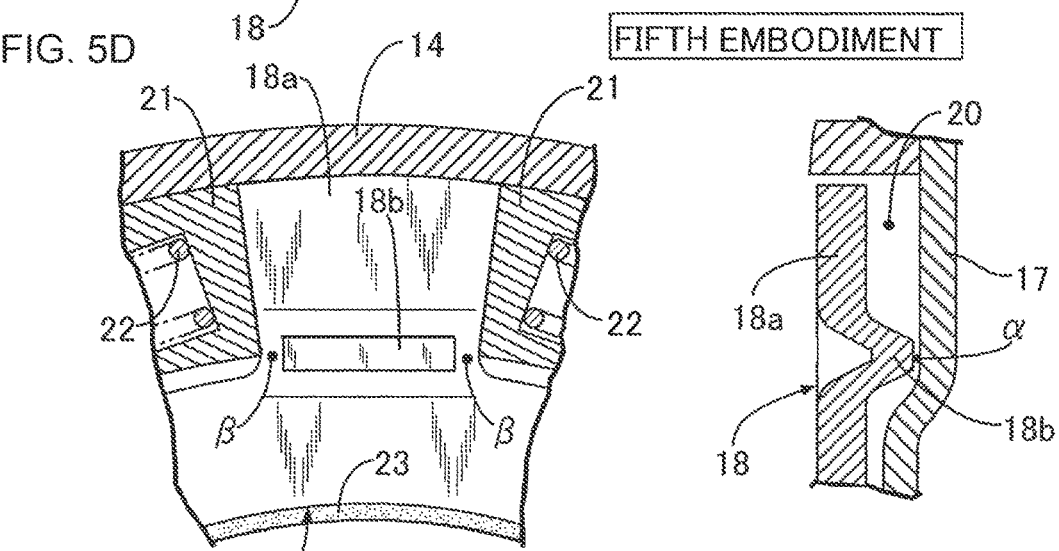

Moreover, a fifth embodiment shown in FIG. 5D is a modification of the fourth embodiment; the linear flow-aligning projection 18*b* is press formed integrally with the arm portion 18*a*.

Figure 5E:
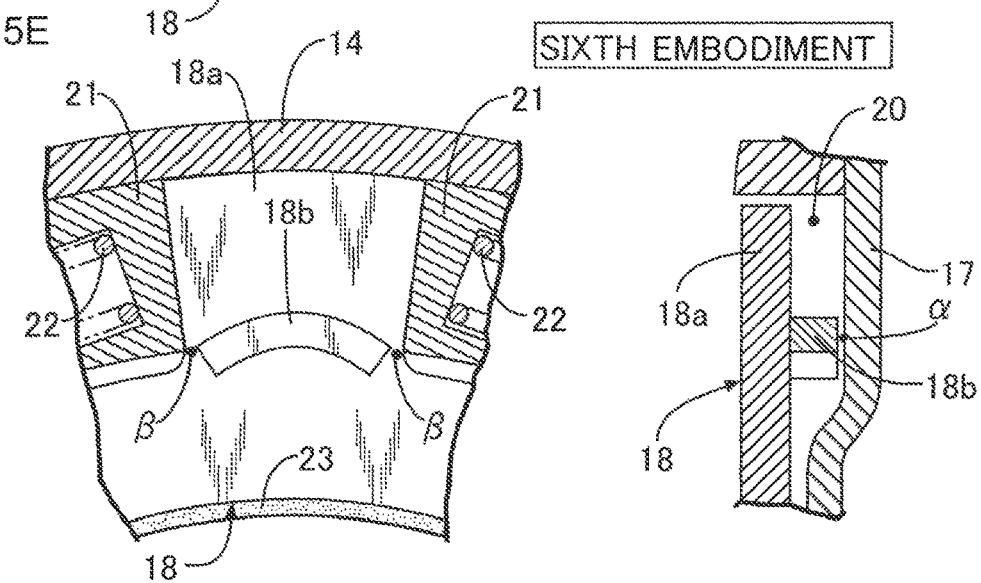

Furthermore, a sixth embodiment shown in FIG. 5E is a modification of the fourth embodiment; the flow-aligning projection 18*b* is formed not as a linear shape but as an arc shape extending in the peripheral direction.

Figure 6F:
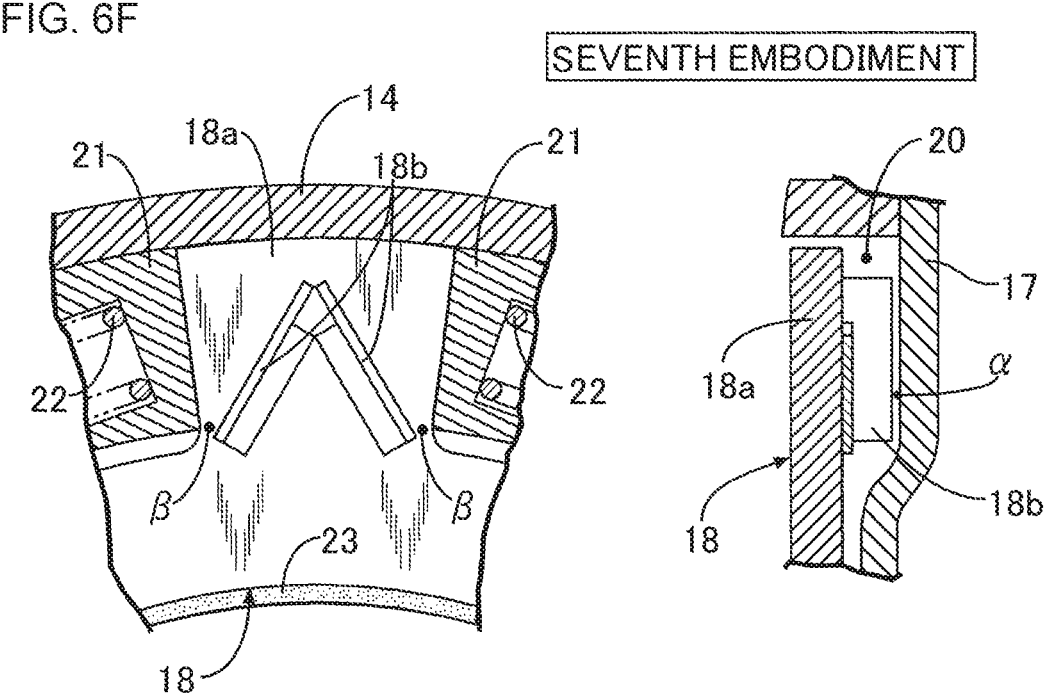
FIG. 6F and FIG. 6G each is a diagram showing another embodiment of the flow-aligning projection.(seventh and eighth embodiments)

Moreover, a seventh embodiment shown in FIG. 6F is a modification of the first embodiment; a V-shaped flow-aligning projection 18*b* that points outward in the radial direction is formed by combining two members having an L-shaped cross section and welding to the arm portion 18*a*.

Figure 6G:
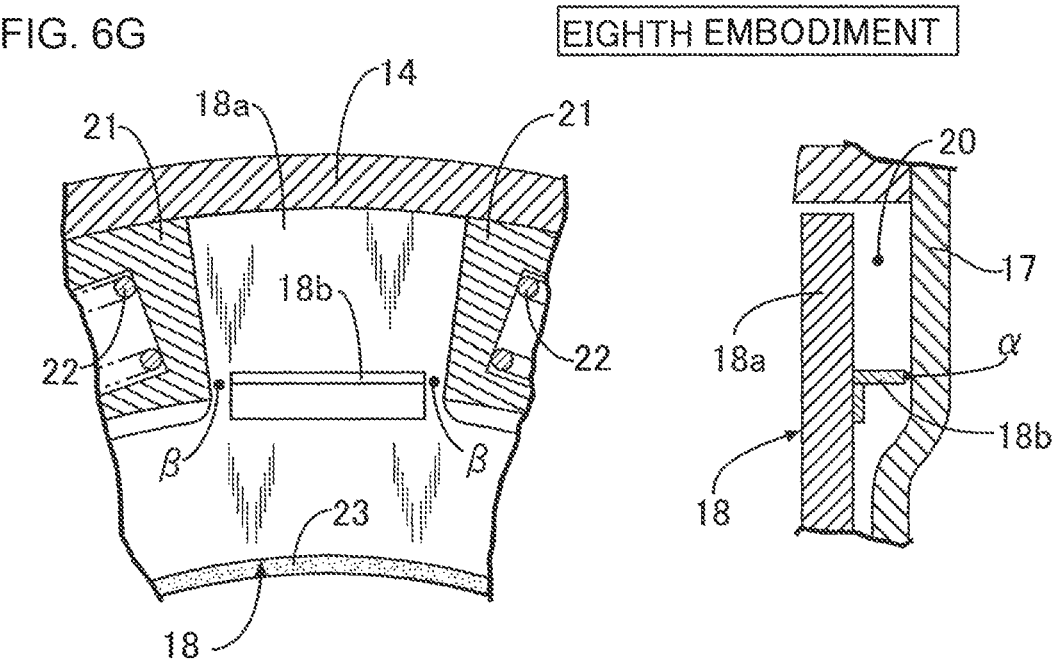

Furthermore, an eighth embodiment shown in FIG. 6G is a modification of the fourth embodiment; the linear flow-aligning projection 18*b* is formed by combining two band-shaped members into an L-shaped cross section and welding to the arm portion 18*a*.

With these second to eighth embodiments, the same operational effects as for the first embodiment can be achieved.

Embodiments of the present invention are explained above, but the present invention may be modified in a variety of ways as long as the modifications do not depart from the spirit and scope thereof.

For example, in the embodiments the flow-aligning projection 18*b* is provided on the driven plate 18 side, but the same operational effects can be achieved by providing the flow-aligning projection on the seal plate 17 side, opposing the arm portion 18*a* of the driven plate 18.

Furthermore, the drive source of the present invention is not limited to the engine E of the embodiments and may be another type of drive source such as an electric motor.

The invention claimed is:

1. A vibration absorber in which a damper disposed between a drive source and a transmission comprising
    a first plate connected to the drive source,
    a second plate connected to the transmission,
    a seal plate fixed to an outer peripheral part of the first plate and disposed between the first plate and the second plate,
    a driven plate fixed to an inner peripheral part of the second plate and disposed between the first plate and the seal plate,
    an annular space formed along an outer peripheral part of the seal plate and the first plate and to be packed with grease in use,
    a spring disposed in a peripheral direction in the annular space and having one end latched on the first plate and the other end latched on an arm portion extending radially outward from the driven plate, and
    a seal member provided on an inner peripheral part of the seal plate and sealing the annular space,
    transmission of rotational fluctuations of the first plate to the second plate being suppressed by relative rotation of the first and second plates and elastic deformation of the spring,
    wherein the vibration absorber comprises a flow-aligning projection that is provided on either one of an arm portion of the driven plate and the seal plate opposing the arm portion and projects toward the other with a gap formed the flow-aligning projection and the other, and the flow-aligning projection is configured to guide grease that is flowing inward in a radial direction in use so as to flow along the peripheral direction.

2. The vibration absorber according to claim 1, wherein a width in the peripheral direction of the flow-aligning projection increases in going from a radially outer side toward a radially inner side.

3. The vibration absorber according to Claim 1, wherein the gap between the flow-aligning projection and the other entirely separates the flow-aligning projection and the other such that the flow-aligning projection and the other entirely do not contact one another.

* * * * *